US006307137B1

(12) United States Patent
Liao

(10) Patent No.: US 6,307,137 B1
(45) Date of Patent: Oct. 23, 2001

(54) ADJUSTABLE CYMBAL STAND

(76) Inventor: Tsun-Chi Liao, No. 14, Chun-Kung Rd., Pei-Tun Dist., Taichung City (TW)

( * ) Notice: Subject to any disclaimer, the term of this patent is extended or adjusted under 35 U.S.C. 154(b) by 0 days.

(21) Appl. No.: 09/598,300

(22) Filed: Jun. 21, 2000

(51) Int. Cl.[7] .................................................... G01D 13/02
(52) U.S. Cl. .............................................. 84/422.3; 84/421
(58) Field of Search ............................... 84/422.1, 422.2, 84/422.3, 421

(56) References Cited

U.S. PATENT DOCUMENTS

| | | | | |
|---|---|---|---|---|
| 5,218,151 | * | 6/1993 | Kurosaki | 84/422.3 |
| 5,388,495 | * | 2/1995 | Atsumi | 84/422.3 |
| 5,482,235 | * | 1/1996 | Atsumi | 248/121 |
| 5,808,217 | * | 9/1998 | Liao | 84/422.3 |
| 6,011,209 | * | 1/2000 | Liao | 84/422.3 |
| 6,177,621 | * | 1/2001 | Hoshino | 84/422.3 |
| 6,239,343 | * | 5/2001 | Hoshino | 84/422.3 |

* cited by examiner

*Primary Examiner*—Robert E. Nappi
*Assistant Examiner*—Kim Lockett
(74) *Attorney, Agent, or Firm*—Bacon & Thomas, PLLC

(57) ABSTRACT

An adjustable cymbal stand comprises: a supporting frame clamped at a generic cymbal stand being provided with an upwardly extended positioning rod; a thread portion formed at a position near the bottom end of the positioning rod; a bearer unit for bearing an upper cymbal being screw-jointed with the positioning rod; the bearer unit having a supporting rod with a winged bolt locked onto the positioning rod; a bearer unit for bearing a lower cymbal being located under the bearer unit for bearing the upper cymbal, and composed of a regulating seat, wherein a turn knob is protruded laterally on both sides of the regulating seat, a tapped hole is formed in center of the regulating seat for screw-jointing with the thread portion of the positioning rod, and a spiral spring is disposed under the regulating seat for propping against the latter. Moreover, the positioning rod is detachable from the supporting frame, wherein a sleeve with a tapped hole and a set bolt can be sleeve-jointed with top end of a generic cymbal stand as another option.

2 Claims, 7 Drawing Sheets

ADJUSTABLE CYMBAL STAND

BACKGROUND OF THE INVENTION

This invention relates generally to musical instruments, more particularly, it relates to an adjustable cymbal stand thereby gap between two cymbals can be regulated rapidly to create various sound effects and a user may have options in use of a whole set or part of this invention.

A generic pedal cymbal stand shown in FIG. 1 contains an upper and a lower cymbal, which are controlled to tap each other to generate sound. If the gap between the cymbals is adjusted to become wider or narrower, the resonance frequency can be changed. A bearer unit is usually provided to the lower cymbal for bearing an upper cymbal, and similarly, another bearer unit is locked to a positioning rod for the upper cymbal to bear the lower cymbal. This architecture only allows a user to adjust the position of the upper cymbal, excluding the lower cymbal, by unlocking a wing bolt, moving the upper cymbal, and locking the wing bolt again. As the lower cymbal cannot be adjusted rapidly on the spot in a concert meanwhile, to obtain desired percussion timbre is rather difficult, and this is the point that this invention is trying to improve.

SUMMARY OF THE INVENTION

The primary object of this invention is to provide an adjustable cymbal stand, wherein gap of an upper and a lower cymbal can be regulated by adjusting the upper or the lower cymbal or both, and a positioning rod can be sleeve-jointed on top end of a generic cymbal stand as another option.

In order to realize abovesaid objects, the adjustable cymbal stand of this invention comprises: a supporting frame clamped at a generic cymbal stand being provided with an upwardly extended positioning rod; a thread portion formed at a position near the bottom end of the positioning rod; a bearer unit for bearing an upper cymbal being screw-jointed with the positioning rod; the bearer unit having a supporting rod with a winged bolt locked onto the positioning rod of the supporting frame; a bearer unit for bearing a lower cymbal being located under the bearer unit for bearing the upper cymbal, and composed of a regulating seat, wherein a turn knob is protruded laterally on both sides of the regulating seat, a tapped hole is formed in center of the regulating seat for screw-jointing with the thread portion of the positioning rod, and a spiral spring is disposed under the regulating seat for propping against the latter. Abovesaid construction enables a user to adjust the gap between the cymbals easily and rapidly for adjustment of sound timbre. Moreover, the positioning rod is detachable from the supporting frame, wherein a sleeve with a tapped hole and a set bolt can be sleeve-jointed with top end of a generic cymbal stand as another option.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
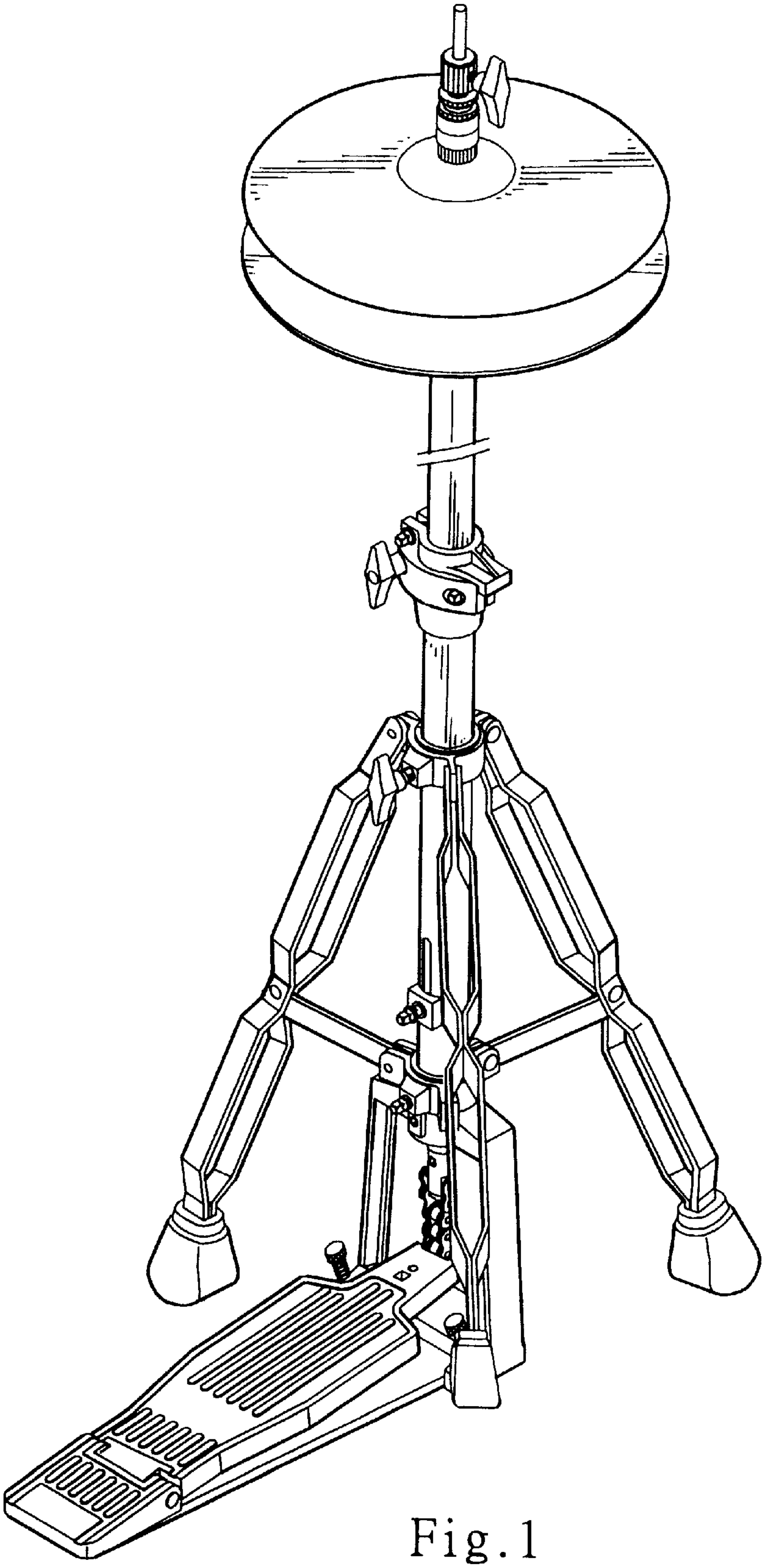
FIG. 1 is an elevational view of a conventional cymbal stand.
Figure 2:
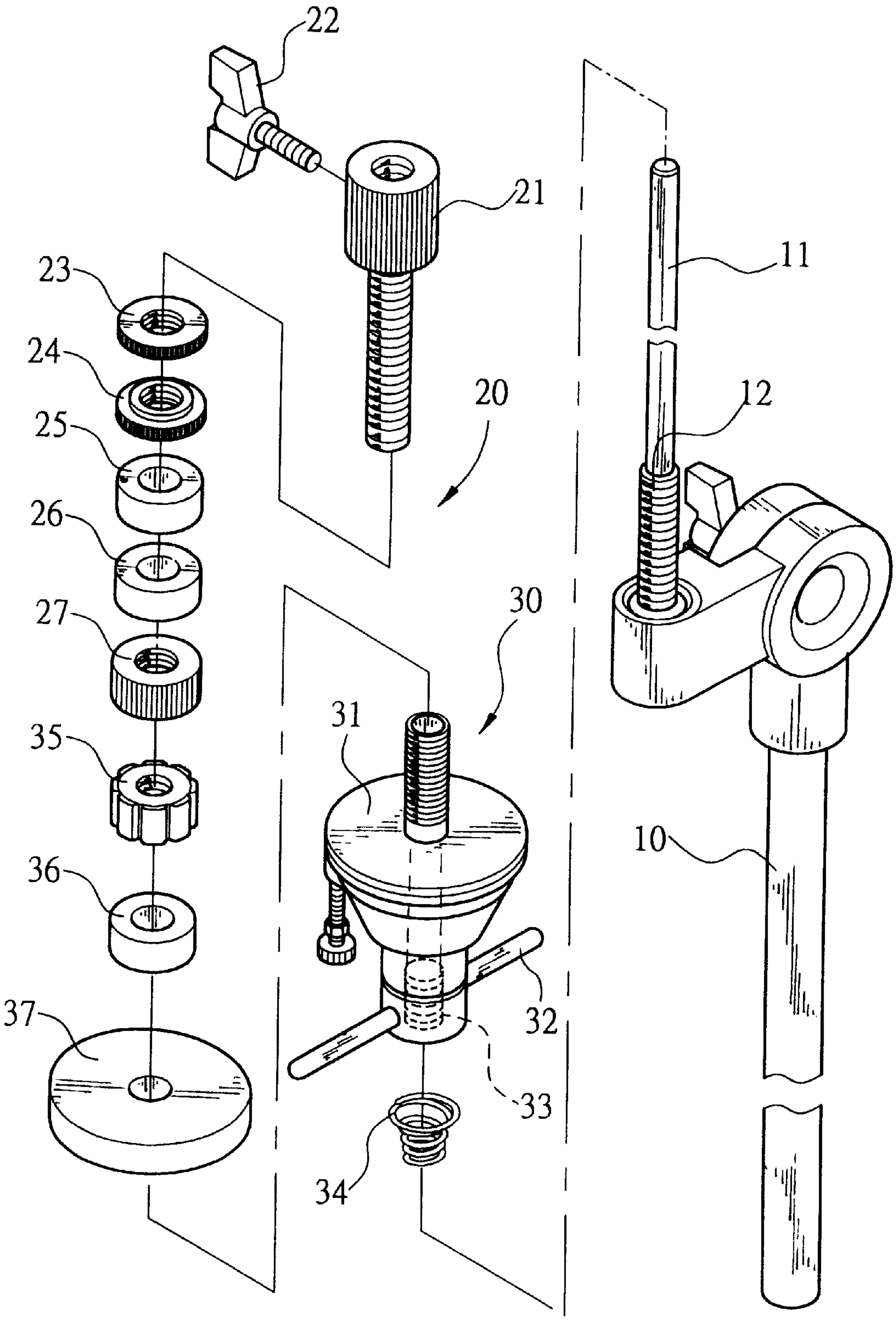
FIG. 2 is an exploded view of this invention in three dimensions.

As illustrated in FIG. 2 through FIG. 7, an adjustable cymbal stand of this invention comprises: a supporting frame 10 clamped at a generic cymbal stand 1 being provided with an upwardly extended positioning rod 11; a thread portion 12 formed near the bottom end of the positioning rod 11; a bearer unit 20 for bearing an upper cymbal being screw-jointed with the positioning rod 11; the bearer unit 20 having a supporting rod 21 with a winged bolt 22 locked onto the positioning rod 11 of the supporting frame 10; an upper and a lower segregating piece 23, 24, an upper and a lower cotton washer 25, 26, and an adjusting nut 27 being disposed on the supporting rod 21 in sequence, wherein the cotton washers 25, 26 are used to clamp the upper cymbal, which can be adjusted by taking advantage of the winged bolt 22 and the bearer unit 20; a bearer unit 30 for bearing a lower cymbal being located under the bearer unit 20 for bearing the upper cymbal, and composed of a regulating seat 31, wherein a turn knob 32 is protruded laterally on both sides of the regulating seat 31, a tapped hole 33 is formed in center of the regulating seat 31 for screw-jointing with the thread portion 12 of the positioning rod 11, a spiral spring 34 is disposed under the regulating seat 31 for propping against the latter; and, a nut 35, an upper and a lower cotton washer 36, 37 are disposed on top of the regulating seat 31 for clamping the lower cymbal.

Figure 3:
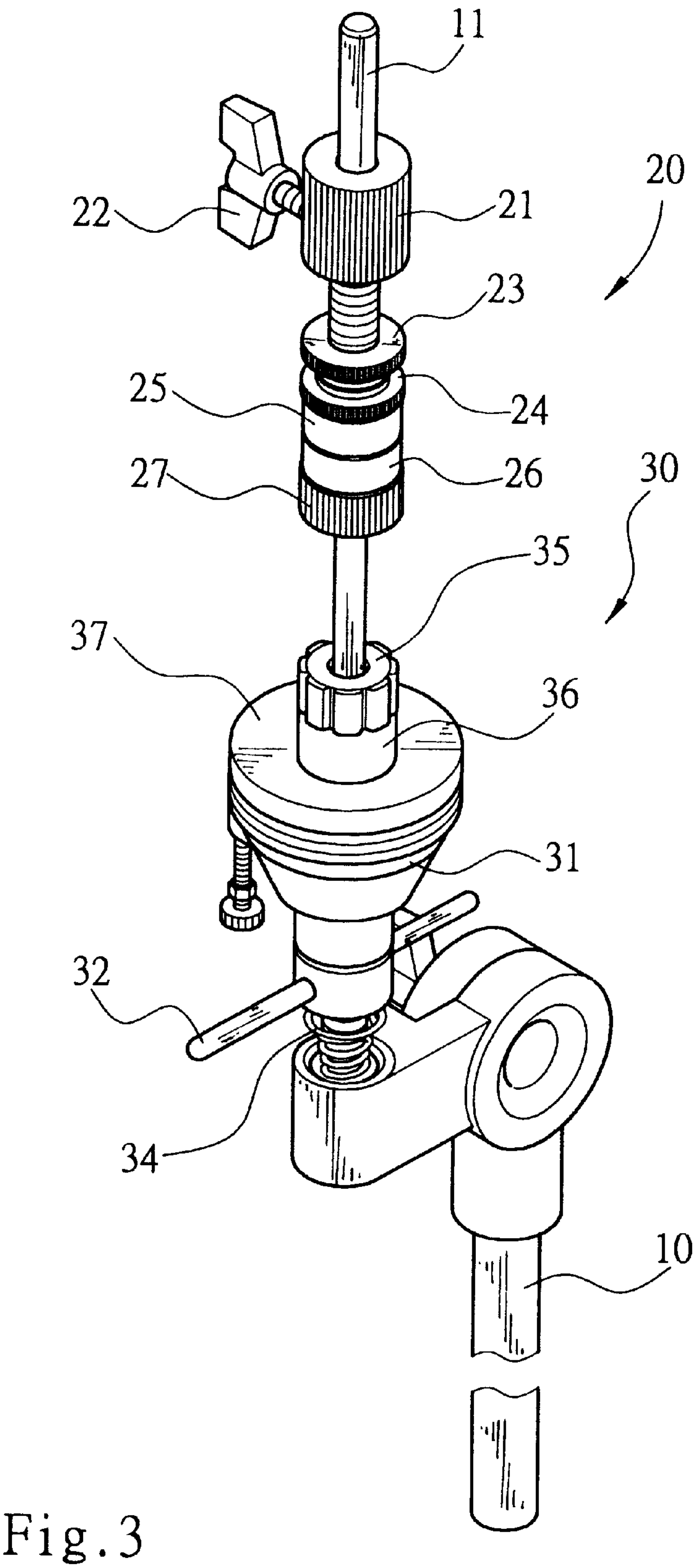
FIG. 3 is an assembled view of this invention in three-dimensions.
Figure 4:
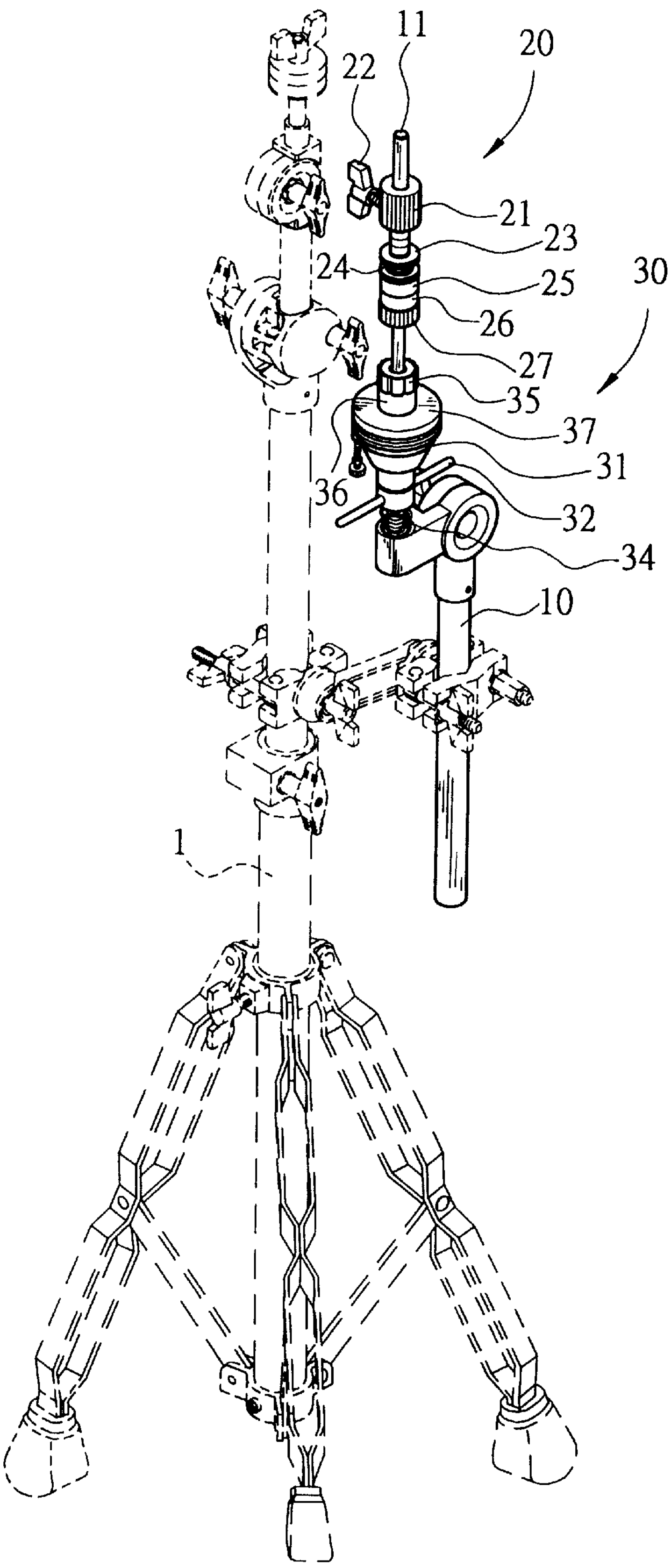
FIG. 4 illustrates an embodiment of this invention.

As shown in FIG. 3, when adjustment of gap between the paired upper and lower cymbals is desired, it can be done by unlocking and locking again the winged bolted 22 for regulating the supporting rod 21 and accordingly the upper cymbal as the way a conventional used to do, or turning the turn knob 32 of the regulating seat 31 to adjust the bearer unit 30 for adjustment of the lower cymbal.co-operatively or alternatively to enhance adjustment flexibility.

Figure 5:
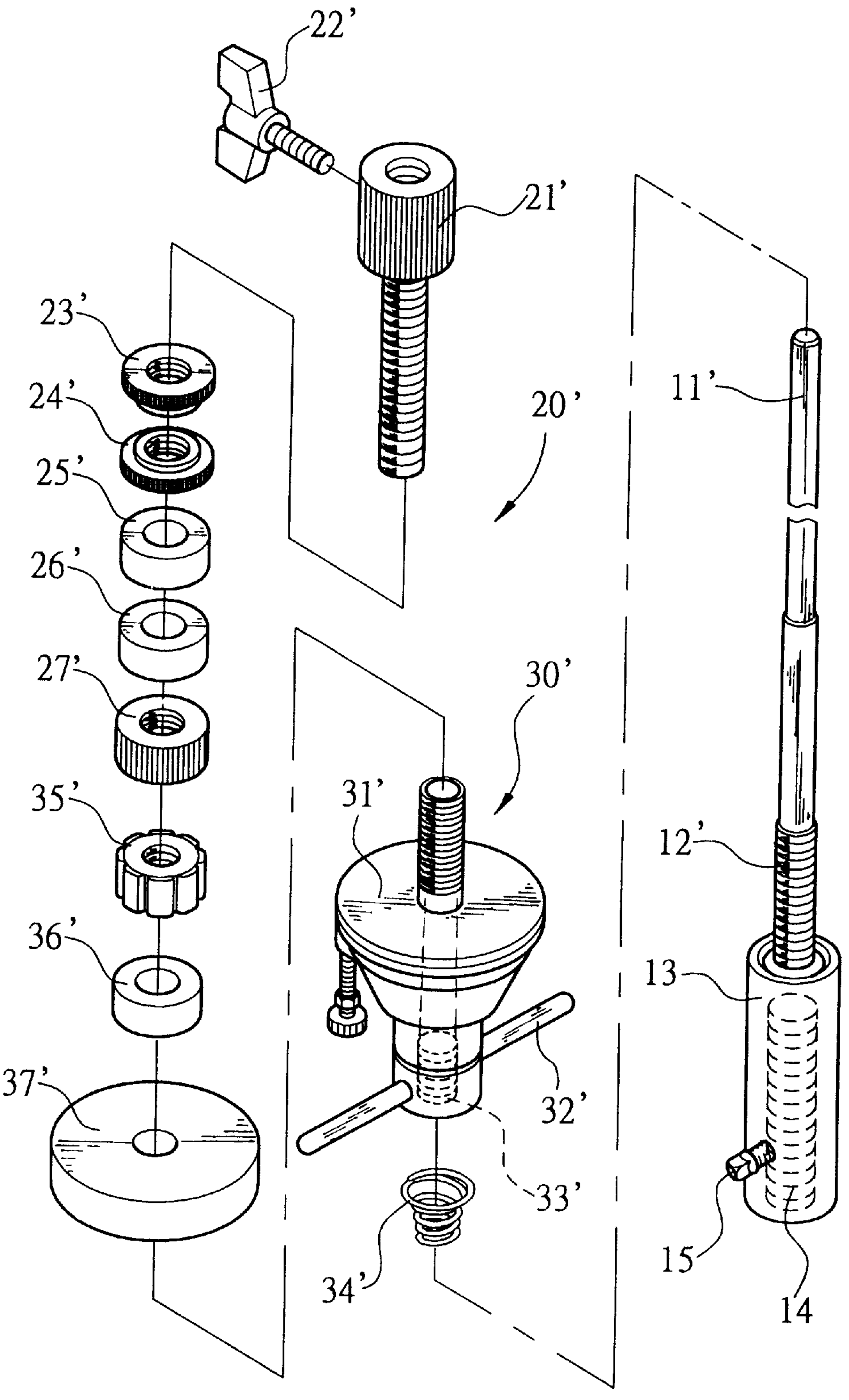
FIG. 5 is an exploded view of another embodiment of this invention.
Figure 6:
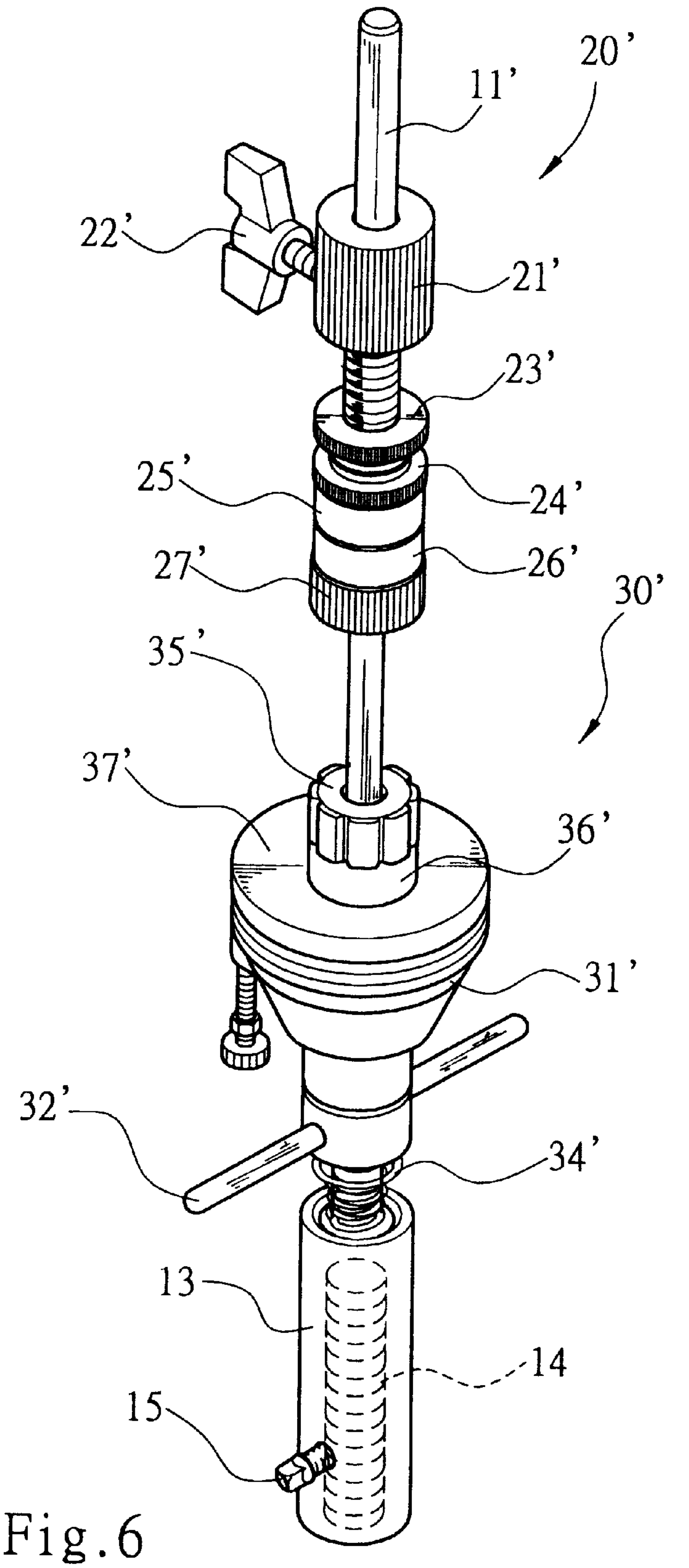
FIG. 6 is an assembled view of the other embodiment in three dimensions.
Figure 7:
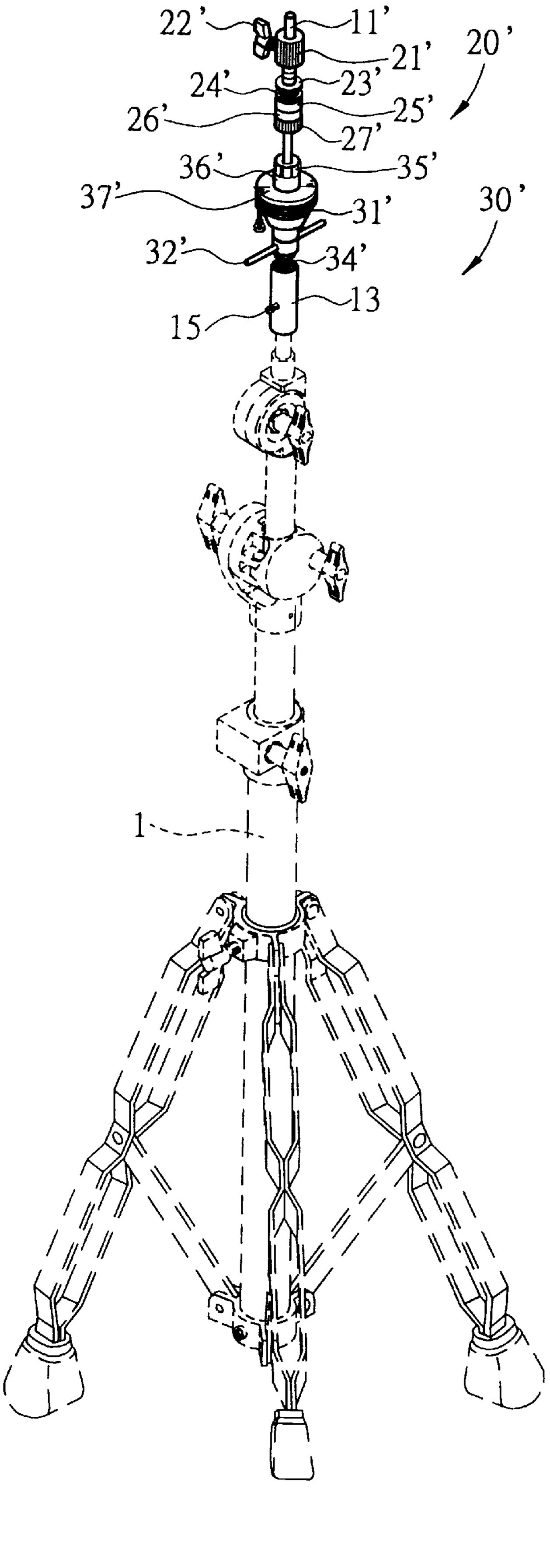
FIG. 7 shows an application example of the other embodiment of this invention.

Another embodiment of this invention shown in FIG. 5 through FIG. 7 comprises: a bearer unit 20' for bearing the upper cymbal; a supporting rod 21'; a winged bolt 22'; an upper and a lower segregating piece 23', 24'; an upper and a lower cotton washer 25', 26'; an adjusting nut 27'; a bearer unit 30' including a regulating seat 31' for bearing the lower cymbal; a turn knob 32' protruding laterally on both sides of the regulating seat 31'; a tapped hole 33' located in center of the regulating seat 31'; a spiral spring 34 arranged under the regulating seat 31'; and a nut 35, an upper and a lower cotton washer 36', 37' disposed on top of the regulating seat 31'. A user may adjust the gap between the upper and the lower cymbal by unlocking the winged bolt 22', adjusting the supporting rod 21', then locking again the winged bolt 22' to have the position of the upper cymbal changed; or turning the turn knob 32' of the regulating seat 31' to have the position of the lower cymbal changed. The structure of the other embodiment is similar to the foregoing described except: a sleeve 13 arranged under a positioning rod 11'; a tapped hole 14 formed in center of the sleeve 13; and a set bolt 15 arranged perpendicular to the outer face of the sleeve 13. Hence, the sleeve 13 can be sleeve-jointed to top end of a generic cymbal stand 1 directly as shown in FIG. 7, and a user may have options to purchase a whole set or part of this invention.

According to abovesaid, the features of this invention may be summarized as the following:

1. A user is allowed to unlock the winged bolt 22 and adjust the supporting rod 21 for regulating the position of the upper cymbal, or, turn the turn knob 32 of the regulating seat 31 for adjusting the bearer unit 30 and accordingly the position of the lower cymbal for easy and rapid adjustment of the gap between the upper and the lower cymbal.
2. The sleeve 13 under the positioning rod 11' can be sleeve-jointed to top end of a generic cymbal stand 1 directly as another option.
3. Both the cymbals can be adjusted rapidly without precedents to obtain crisp and vivid sound effect.

Although, this invention has been described in terms of preferred embodiments, it is apparent that numerous variations and modifications may be made without departing from the true spirit and scope thereof, as set forth in the following claims.

What is claimed is:

1. An adjustable cymbal stand, comprising: an upwardly extended positioning rod arranged on a supporting frame of a generic cymbal stand; a thread portion formed near a bottom end of the positioning rod; a bearer unit for bearing an upper cymbal being screw-jointed with the positioning rod; the bearer unit having a supporting rod with a winged bolt locked onto the positioning rod of the supporting frame; a bearer unit far bearing a lower cymbal being located under the bearer unit for bearing the upper cymbal, and composed of a regulating seat, wherein a turn knob is protruded laterally on both sides of the regulating seat, a tapped hole is formed in center of the regulating seat for screw-jointing with the thread portion of the positioning rod, and a spiral spring is disposed under the regulating seat for propping against the latter.

2. The adjustable cymbal stand according to claim 1, wherein a sleeve is disposed at a tail end of the positioning rod; a tapped hole is formed in center of the sleeve; and a set bolt is arranged perpendicular to an outer face of the sleeve.

* * * * *